(12) United States Patent
Osann, Jr.

(10) Patent No.: US 8,594,705 B2
(45) Date of Patent: Nov. 26, 2013

(54) SYSTEM FOR PREVENTING TEXT MESSAGING WHILE DRIVING

(76) Inventor: Robert Osann, Jr., Morgan Hill, CA (US)

( * ) Notice: Subject to any disclaimer, the term of this patent is extended or adjusted under 35 U.S.C. 154(b) by 665 days.

(21) Appl. No.: 12/592,899

(22) Filed: Dec. 4, 2009

(65) Prior Publication Data

US 2011/0136509 A1      Jun. 9, 2011

(51) Int. Cl.
   *H04W 24/00*    (2009.01)
   *H04M 3/00*     (2006.01)
   *H04B 1/38*     (2006.01)

(52) U.S. Cl.
   USPC ............. 455/456.3; 455/456.4; 455/418; 455/565; 455/67.11

(58) Field of Classification Search
   None
   See application file for complete search history.

(56) References Cited

U.S. PATENT DOCUMENTS

| | | | |
|---|---|---|---|
| 7,937,075 B2 * | 5/2011 | Zellner | 455/418 |
| 2007/0072553 A1 * | 3/2007 | Barbera | 455/67.11 |
| 2008/0064446 A1 * | 3/2008 | Camp et al. | 455/565 |
| 2009/0002147 A1 | 1/2009 | Bloebaum et al. | 340/466 |
| 2009/0098855 A1 | 4/2009 | Fernandez et al. | 455/410 |
| 2009/0111422 A1 | 4/2009 | Bremer et al. | 455/404.2 |
| 2009/0149168 A1 * | 6/2009 | McLean | 455/418 |
| 2009/0163243 A1 | 6/2009 | Barbera | 455/557 |
| 2009/0215466 A1 | 8/2009 | Ahl et al. | 455/456.1 |
| 2009/0224931 A1 | 9/2009 | Dietz et al. | 340/670 |
| 2009/0240464 A1 | 9/2009 | Dietz et al. | 702/143 |
| 2009/0253423 A1 | 10/2009 | Kullberg | |
| 2010/0204877 A1 | 8/2010 | Schwartz | |
| 2010/0216509 A1 | 8/2010 | Riemer | |
| 2011/0034185 A1 * | 2/2011 | Hartmaier et al. | 455/456.4 |
| 2011/0105097 A1 * | 5/2011 | Tadayon et al. | 455/418 |

FOREIGN PATENT DOCUMENTS

| | | |
|---|---|---|
| EP | 1737193 | 12/2006 |
| EP | 2099203 | 3/2008 |
| EP | 2216970 | 8/2010 |
| WO | WO2008027076 | 3/2008 |
| WO | WO 2011011544 | 1/2011 |
| WO | WO 2011037642 | 3/2011 |

* cited by examiner

*Primary Examiner* — Jinsong Hu
*Assistant Examiner* — William Nealon
(74) *Attorney, Agent, or Firm* — Fliesler Meyer LLP

(57) ABSTRACT

A system and method are described to disable texting while driving a moving vehicle. The position and speed of a user's cell phone are compared with that of a registered master phone. If the position and speed match that of the master phone, it is assumed that the user is a passenger and not a driver, and texting is enabled for that user. Texting at speed is disabled for a master phone user who may be an ordinary citizen or may be a professional driver of a mass transit vehicle. A professional driver may be known to the service provider and his phone may receive special treatment such that he is prevented from texting while driving but may be allowed to text while riding as a passenger. Passengers and operators of a train may be treated differently since the roadbed of a train has a known position.

19 Claims, 6 Drawing Sheets

SYSTEM FOR PREVENTING TEXT MESSAGING WHILE DRIVING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to the field of cellular phones and cellular communications technology including text messaging, emailing, and voice communications technology, GPS technology, related computer systems and software, and vehicular transportation modalities.

BACKGROUND

It has become a widely known problem that text messaging while driving is dangerous. Recent data shows that while text messaging, a person has an impairment level twice that of a person who is legally drunk. In the US in 2008, 6,000 deaths were attributed to distraction while driving and many of these fatalities were related to text messaging. In many states it is now against the law to text message while driving. Studies show a person is 23 times more likely to crash when texting behind the wheel. As a result of these alarming statistics, governments are considering steps toward wider bans on text messaging and emailing while driving.

While banning text messaging by law is an important step towards mitigation of this problem, that alone may be insufficient. Many states have instituted hands-free laws for cell phone use, and a large percentage of the populace simply ignores these laws. While holding a cell phone to your ear reduces your ability to properly control your car, the degree of distraction afforded by text messaging or emailing while driving makes voice use of cell phones seem insignificant by comparison. Additionally, texting has become highly addictive for many people—especially younger people. This has recently been further encouraged by social networking functionalities, such that many people will compulsively persist in texting while driving regardless of the laws unless a mechanism to defeat their dangerous habit is implemented. In considering the implementation of mechanisms to defeat text messaging, a major challenge is that it is difficult to distinguish between a person driving a car or truck and a person riding in the car as a passenger or riding on public transportation. There are many positive reasons to encourage people to ride on public transportation, and it is important that steps be taken not to discourage them to do so. It is also important for similar reasons to allow people riding as passengers in a carpool situation to utilize text messaging and emails while in a moving vehicle. An effective mechanism for defeating text messaging while driving must provide individuals who habitually take public transportation or carpool with the ability to text message and email while traveling by these means. Also, to broadly enforce a ban in a shortened period of time, it is useful that any solution not require modifications to existing cell phones. The most effective short term solution would use existing cell phones and existing cellular communications hardware and be implemented solely via software at the mobile service provider. The next most effective solution would include hardware changes in the cellular infrastructure but still require no changes to cell phones. Last, easily downloaded software changes to cell phones might be acceptable under certain conditions but are not desirable.

Cell phones in use today already contain GPS location capability as part of the emergency response network. The ability to query the location of cell phone from a central location using the GPS receiver in a cell phone is useful for many purposes, and for the purposes of this invention is useful to determine both the location and the velocity of a person according to the position and speed of lateral movement of his cell phone. Position location by triangulation from multiple cell towers may be combined with GPS (AGPS or Assisted-GPS), when readings purely from a phone's GPS receiver alone are not sufficient.

Prior art inventions address the issue of allowing passengers on public transportation to text while moving by inferring that people are on such public transport by their commonality of wireless signal attributes. These solutions would require hardware changes within the service provider's infrastructure. These solutions also ignore the fact that the driver of a public transportation vehicle must be prevented from texting on his phone. Serious train and bus accidents with many lives lost have been attributed to texting by the driver/operator. Prior art inventions also do not adequately address the scenario where passengers are riding in a carpool situation as the driver would still be allowed to text unless modifications were made to both cars and cell phones. Proposed solutions to allow passengers in a car to text while moving involve some form of proximity sensor to determine that a person is not sitting in the drivers seat. Unfortunately, this requires that enhanced phones must be purchased for all such passengers and that cars be specially designed to have devices implanted at certain seat locations. Thus, this only works for new cars and trucks and also requires users to purchase new cell phones.

Again, to implement an enforced ban on texting in a very short amount of time, it is necessary to deploy a solution that can be generally effective without requiring changes to currently deployed user phones, existing cellular hardware infrastructure, or existing vehicles.

SUMMARY

As described herein, the terms "texting" and "text messaging" and the verb "to text" shall also include sending and receiving emails and any form of communication via a cellular communications network that is not purely voice. Although the term "texting" often has a specific definition, for the purpose of general discussion relative to the dangers of "texting while driving" the media has chosen to frequently refer only to "texting" and thus this specification hereby adopts that terminology for those various forms of textual communication. Also, the term "driver", "operator", and "engineer" are also used interchangeably. Cars, trucks, and busses are normally said to have "drivers", however, trains are typically said to have "operators" or "engineers", hence for the purpose of the present invention, all of these terms are used synonymously. A driver of a public transportation vehicle may also be referred to as a "professional operator" or "professional driver" and it may be a requirement for some embodiments of the present invention that cell phones belonging to such persons be specially recorded as such at the cellular service provider and be treated differently from phones used by the general public. For the purposes of the present invention, a "cell phone" may be any mobile communications device capable of any form of textual communications, including PDAs and even notebook computers. A cellular "Service Provider" may at times be referred to herein as "SP". The user of a cell phone is typically referred to as "him" but actually refers to "him or her".

According to this invention the position of a person's cell phone is queried from a central location via the cellular communications link in a manner similar to that performed by the emergency response network. The position and velocity of a person's cell phone are determined. The lateral direction of travel of the person's cell phone may also be determined. These determinations may be performed by means of the comparison of successive position queries or other means, including information obtained directly from the phone if available. The fact that a person is in a moving vehicle is then determined by comparing this determined velocity with a minimum velocity threshold—the "disable threshold"—for determining disablement of texting. If sufficient position and speed information is not available from a GPS receiver in the phone at a certain point in time, the position and speed may be supplemented by triangulation of signals as referenced from multiple cellular towers, as in A-GPS or Assisted GPS, or purely by triangulation. If a person's cell phone contains internal information available to the service provider that includes any of velocity, location, or direction information, that information may also be queried by the service provider according to this invention.

One object of this invention is to prevent a person from sending or receiving text messages or emails on a cell phone while driving. To do so, the invention disables this capability for anyone riding in a moving vehicle unless he is a passenger on public transportation (bus/train), or unless the person is a passenger in a car/truck under certain conditions such as a carpool. To "disable texting", the service provider at a minimum would disable the transfer of text messages and emails from the SP to the user's phone, and also will disable the receipt of text messages and emails at the SP that are sent from the user's phone. It may be impossible to prevent the user from composing a text message or email on his phone while driving without altering the programming in the phone, and thus is not a preferred capability of this invention. However, it is possible to delay the resumption of the ability to send emails for a period of time after a person ceases to drive, such that there is little motivation to compose while driving. The user may as well wait to compose until after he stops since there would be time available then anyway. Fortunately, most text messages are relatively short, and it is text messages that have become the most addictive and are the bulk of the current hazard, especially those associated with certain popular social networking sites.

Another object of this invention is to implement a system to disable text messaging and emailing while driving without requiring any changes to the base of cellular phones currently installed, and preferably without requiring any changes to the existing cellular communications system hardware infrastructure. In the most desirable outcome, only software changes on the part of the service provider and implemented only within their infrastructure would be required to implement the key capabilities described herein. The majority of currently deployed phones contain GPS capability. For those phones not containing GPS receivers, the system according to this invention may rely solely on triangulation of signals from cellular towers. Alternately, this relatively small subset of phones may be excluded from texting and emailing capability. In most cases, these users would probably have replaced their phones in the near future anyway due to a desire for enhanced features, incompatibility with newer provider infrastructure, of simply the physical or electronic degradation of their current phone. Historically, infrastructure changes in cellular networks have, from time to time, forced users to replace their phones. Also, some older phones do not have the ability to text, email, or connect to the Internet.

Another object of the invention is to allow a person to text when his phone is within the "envelope" of a master phone. The envelope of a cell phone may include position information only and is therefore sometimes described herein as a "position envelope". The envelope of a cell phone may also include the lateral speed of the phone and/or the direction of travel of the phone. Which of these parameters is included is implementation dependent, and all combinations thereof are encompassed by the present invention. The grater the number of parameters that are included, the more computations need to be performed within the SP infrastructure and the more complicated and expensive the solution gets. An SP, potentially in concert with government authorities, may implement a simple form of the present invention and measure the results before implementing a more complicated and expensive form.

It should be noted that the envelope of a cell phone per this invention may be viewed from two perspectives. A master phone may have an envelope and other cell phones may be described as being in the envelope of the master phone. Alternately, a group of cell phones traveling together (carpool or mass transit) may be said to have an envelope. Either way, the "envelope" is meant to encompass that of the vehicle in which persons traveling together are riding as referenced from the position of a phone or phones. If a master phone is within the envelope of a group of phones, then the group of phones is also within the envelope of the master phone.

Beyond including position information, an envelope may also include cell phones maintaining the instantaneous speed of a master phone so that a person in a car/truck is prevented from riding close to a bus in order to be allowed to text. Maintaining the instantaneous speed includes the speeds of passenger cell phones tracking small speed changes that are made by the master phone. Deviations relative to how closely these speeds track each other may be compared with a "threshold of equality" to determine that a passenger cell phone user is actually riding in the same vehicle with the user of a master phone. This speed comparison may be used to determine which vehicle a passenger is actually in when his cell phone appears to be within the position envelope of multiple master phones.

The direction of travel may also be included as a requirement for being in the "envelope", however in actual implementation, it may not be necessary to utilize the direction of travel of a cell phone. If the position and velocity of a cell phone are to match that of a master phone over a period of time long enough to send and receive text messages, their direction of travel will in fact need to be the same. The master phone may belong to either a professional driver or to a driver of a carpool vehicle. The act of registration of a master phone is preferably performed by a voice call (preferably initiated by a single key on speed dial) or by a text message that can be sent with a minimum number of key presses (preferably one) to a special destination reserved for this purpose that is enabled for texting even when a phone is traveling faster than the disable threshold. It may also be useful if a professional driver who has registered his phone as a master phone is previously known to be a professional driver of a mass transit vehicle, and what type of vehicle he drives. Then, the length of the master phone position envelope can be computed according to the length of the vehicle. Given the inaccuracy of GPS and other location mechanisms, it is useful to compare the instantaneous velocity of phones that appear to be within the envelope of a master phone with that of the master phone in order to disable texting for cell phones in cars that are adjacent to the mass transit vehicle.

Another object of this invention is to allow a person riding on public transportation (bus/train) to be allowed to send and receive text messages or emails, while not allowing the professional driver/operator to send and receive text messages or emails while moving. This can be done by disabling texting for all phones in the vehicle until the driver registers his phone as a master phone. When the driver registers his phone as a master phone, his ability to text is disabled while users riding in the mass transit vehicle, whose phones are therefore in the envelope of the master phone, are allowed to text. If the professional driver is previously known by the SP to be a professional driver of mass transportation, he can be prompted (preferably via voice message) to register when in the presence of a group of cell phone users who are traveling in a group and at the same speed. Such a group essentially establishes their own envelope, the envelope being determined by the SP based on the position and velocity of the phones in the group. The SP then determines if the professional driver is within the envelope with the group of cell phones. The professional driver can choose to decline to register if he is at that moment riding as a passenger and not as the driver. Therefore, the registration of a cell phone belonging to a known professional driver can be purely voluntary, voluntary after being prompted, or fully automatic.

Similarly, a group of cell phone users participating in a carpool vehicle at speed may form their own envelope. Subsequently, if there is no currently registered master phone within the group and a carpool participant whose phone is within the envelope attempts to send or receive test messages, that user may be prompted that one of the group (the legal driver) should register so that the others can successfully text. Any participant in the carpool who finds his texting capability disabled can simply ask the driver to register as a master phone in order to allow the other carpool participants to text.

Similar methods are applicable to passenger and driver use of cell phones on trains. The process of establishing the position envelope for a train has unique challenges since a long train may form a curved or serpentine shape rather than the simple rectangle shape for a bus, truck, or car. On the other hand, the GPS coordinates for the railroad bed are known and may be useful in establishing a position envelope for a train.

There may exist different ways that individuals may try to bypass the system described herein and accordingly, mechanisms to discover these attempts and thwart them are also discussed herein.

Given the accuracy of position determination of a phone and therefore the accuracy for the envelope of a master phone or a group of passenger phones, the parameters for operating a system as described herein may be tuned over time with experience in order to determine the optimum parameters. Examples of these parameters include:
- the position envelope size and shape;
- the threshold of equality for the speed of a cell phone to track a master phone;
- the time delay for allowing automatic re-enablement; and
- the speed for the disable threshold.

DETAILED DESCRIPTION OF THE INVENTION

According to the present invention, it requires a certain minimum velocity of movement of a cell phone to disable texting. This velocity should be greater than what can be achieved jogging or walking. Speeds achievable on a bicycle are probably acceptable to cause text prevention since a person texting on a bicycle at speed is a danger to traffic and himself, and because it is less likely that a person will be texting while riding a bicycle at speed.

The velocity for setting the disable threshold speed may be a specific level, for instance, 10, 12, or 15 mph. For a person to travel at more than 10 miles per hour he is either running, cycling, skateboarding, or in a motor vehicle. Texting while running at over 10 mph is probably difficult enough to be considered unnecessary. Texting while bicycling or skateboarding at over 10 mph may be considered dangerous.

Simply disabling texting for cell phones traveling in excess of a disable threshold is not acceptable because it would discourage people from utilizing mass transit and carpools when riding as passengers. Therefore, the present invention focuses on a system and methodology that provides such passengers the ability to text message while traveling at speed. This is accomplished by the service provider's system determining that an individual's cell phone traveling in excess of the disable threshold speed is within the envelope of a registered master phone. While the description provided herein focuses on system and software infrastructure provided by a mobile communications Service Provider (SP), it should be understood that the SP's system may operate in conjunction with systems and software belonging to government agencies to implement the functionalities described herein.

Figure 1:
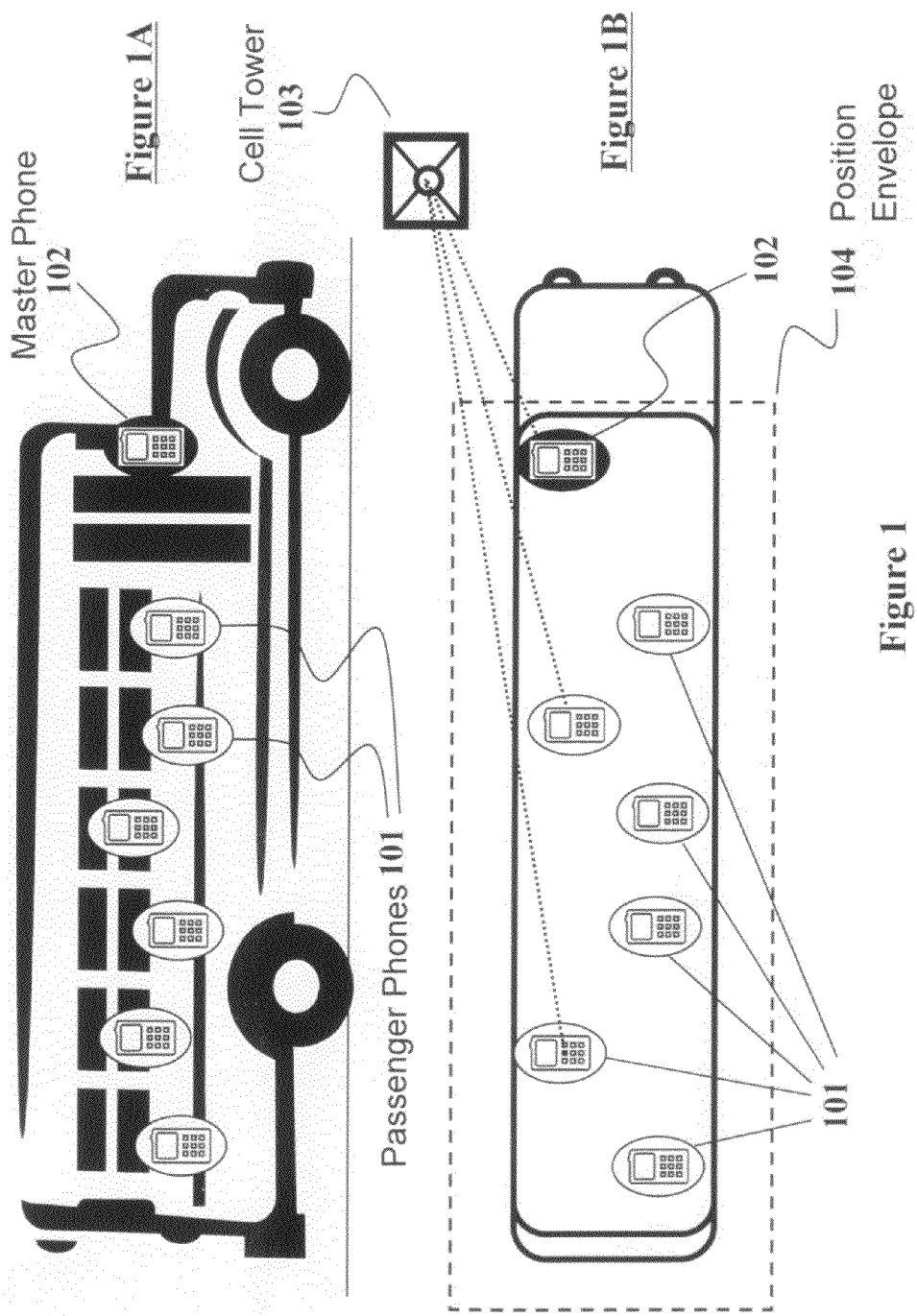
FIG. 1 shows the envelope for a bus including passenger cell phones and a registered master phone owned by a professional driver.

FIG. 1 shows the cell phones of individuals traveling on a mass transit vehicle, in this case a bus. In the cross-section diagram shown in FIG. 1A, passenger phones 101 are shown in proximity with master phone 102. The top view shown in FIG. 1B again shows passenger phones 101 and master phone 102, now in communication with cellular tower 103. Also shown is position envelope 104 which is established based on the master phone position such that passenger phones 101 are encompassed within the envelope.

Figure 2:
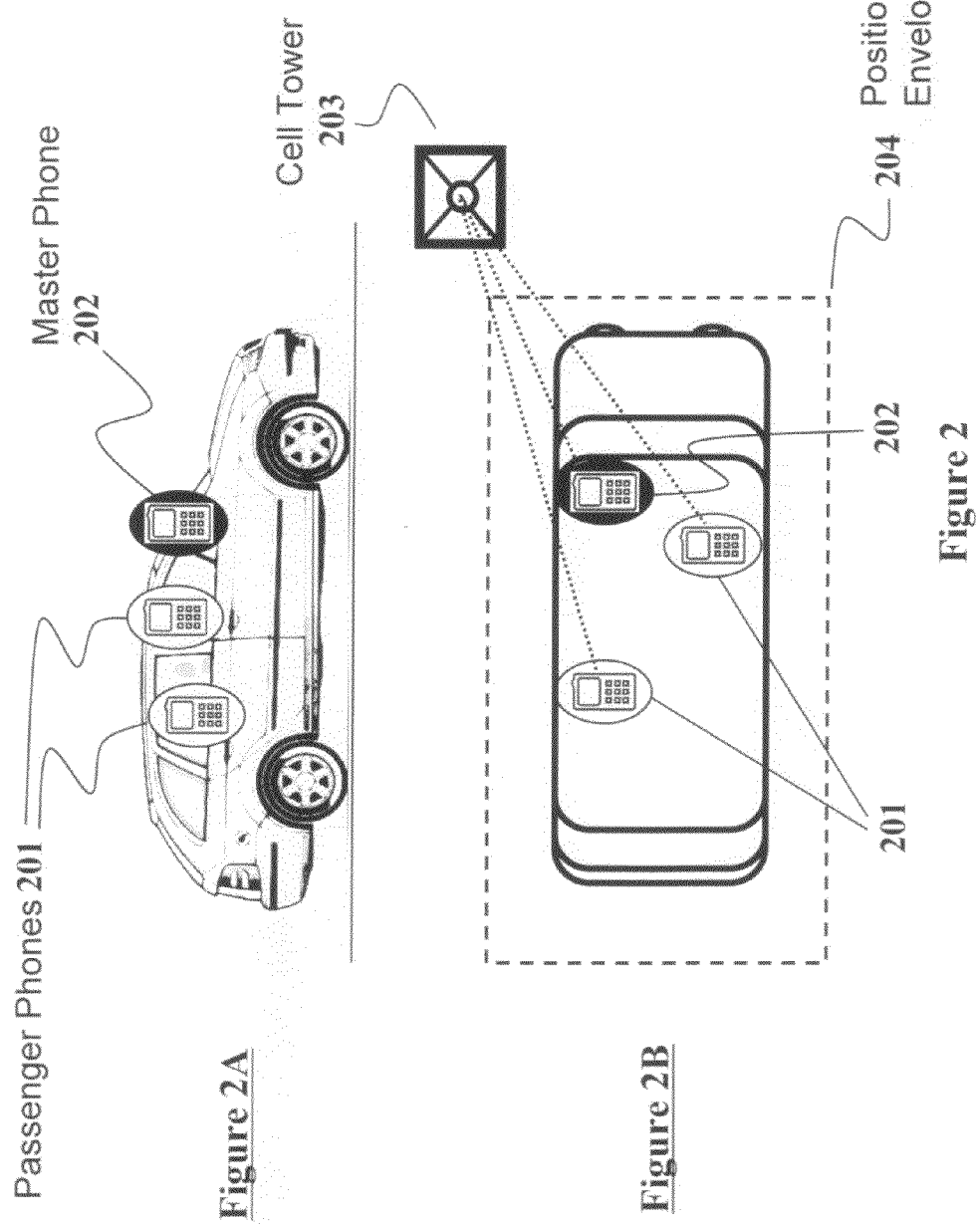
FIG. 2 shows the envelope for a car including cell phones belonging to carpool passengers and a registered master phone owned by the driver.

FIG. 2A shows a similar scenario to that of FIG. 1 except that instead of a mass transit vehicle, the vehicle is a conventional passenger car wherein at least one passenger is accompanying the driver to form a carpool. Thus per FIG. 2B, passenger phones 201 are in close proximity to master phone 202 and all phones are in communication with cell tower 203. In a similar manner to FIG. 1, a position envelope 204 is established with respect to master phone 202, that envelope encompassing passenger phones 201.

The owner of a master phone must have a valid driver's license. To better support the present invention, SPs may require that each phone in a family be assigned to a specific individual if this has not been previously done, so that a child's phone, an elderly person's phone, or any phone that belongs to person without a driver's license cannot be used to spoof a master phone. Government agencies may also correlate across cellular providers to ensure that each individual has only one cell phone assigned and active, again so as to prevent an individual from using one phone to spoof a master while texting on the other. Alternately, if an individual is allowed to have multiple phones assigned to him, the SP system may prevent texting on all such phones if any are moving in excess of a disable threshold speed while not within the envelope of a master phone.

A professional driver/operator of a public transportation vehicle may also be treated specially. The SP may maintain a database of known professional drivers, or be in communication with organizations that maintain such databases such as mass transit companies and/or government agencies that monitor and/or administrate mass transit operations. An SP may always treat the phone of a professional driver as a potential master phone, and in one embodiment the professional driver may be required to make a "request" to text while moving when he is not acting as an on-duty operator. If he is found to be texting during hours he is scheduled for duty, he may be found to be in violation of the law. Given their liability for an entire vehicle full of passengers, it is proper that professional drivers be given some form of special scrutiny.

Figure 3:
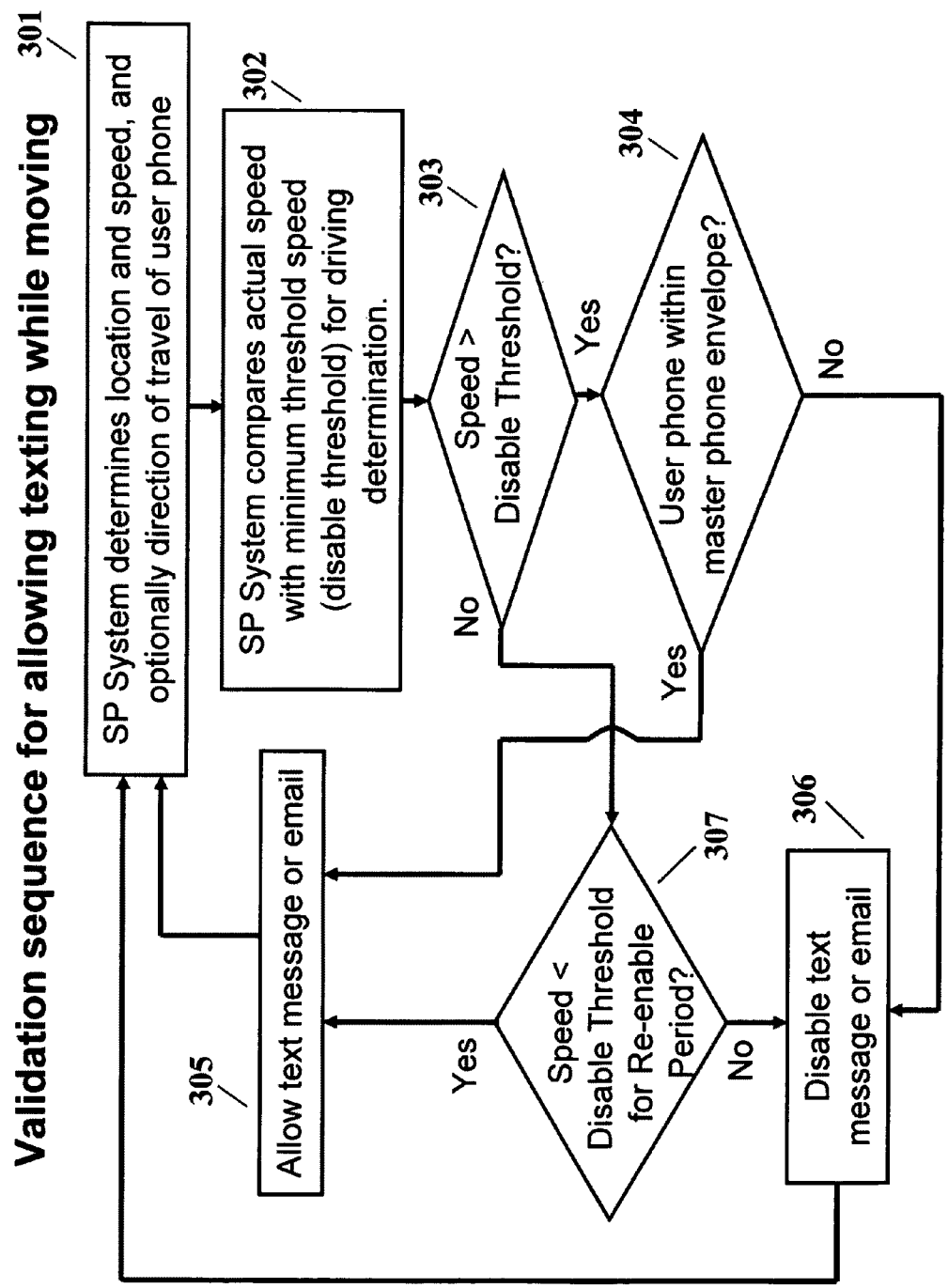
FIG. 3 shows the validation sequence whereby a service provider will prevent the driver of a vehicle from texting while allowing passengers to text.

FIG. 3 shows a possible validation sequence for allowing texting on a moving cell phone according to the present invention when that cell phone is within the envelope of a master phone. In step 301, the SP system determines the location and speed of a cell phone and may optionally also determine the direction of travel of the phone. Then, in step 302 the SP system compares the determined speed of the cell phone with a minimum threshold (the disable threshold speed) in order to determine if the phone is moving fast enough to be considered a danger for texting. According to step 303, if the cell phone's speed is greater than the disable threshold, a determination according to step 304 will be made to decide if the cell phone is within the envelope of a master phone. If the speed of the cell phone exceeds the disable threshold and is not within a master phone envelope, then according to step 306 texting will be disabled for that cell phone. If however, the cell phone is within a master phone envelope, then according to step 305 texting will be allowed for that individual's cell phone. If the system determines that according to step 303 the speed of the cell phone is less than the disable threshold, then according to step 307 a determination will be made to decide if the cell phone speed has been less than the disable threshold for a period of time—the "re-enable period". Only if the cell phone speed has been less than the disable threshold for a period of time equal to the re-enable period, will the user of that cell phone once again be allowed to text.

When a person's phone stops moving, or drops below the disable threshold for a certain amount of time, it is assumed that the vehicle is no longer moving or is no longer in stop-and-go traffic, and his phone is re-enabled for texting. This re-enable period may be chosen to be sufficiently longer than the longest traffic signal cycle time, or by other means. It may be set by varying the re-enable delay and measuring the results. For instance, if a text message is sent immediately after the re-enable period expires and the length of the message is such that it could not have been composed by a typical user within the re-enable period, that is a clue that the re-enable period may not be long enough. The time delay for the re-enable period provides extra minutes of time to compose a text message after completing a period of driving, rather than trying to compose a message while driving. To ensure that a driver is not simply caught in stop and go traffic whereby a cessation of motion is simply temporary, the re-enable period must be of sufficient length. Regarding the stop and go scenario, were it not for the re-enable period that prevents sending messages after stopping, some drivers addicted to text messaging would compose their messages while moving and send them while stopped during the cyclical pattern of stop and go driving.

Figure 4:
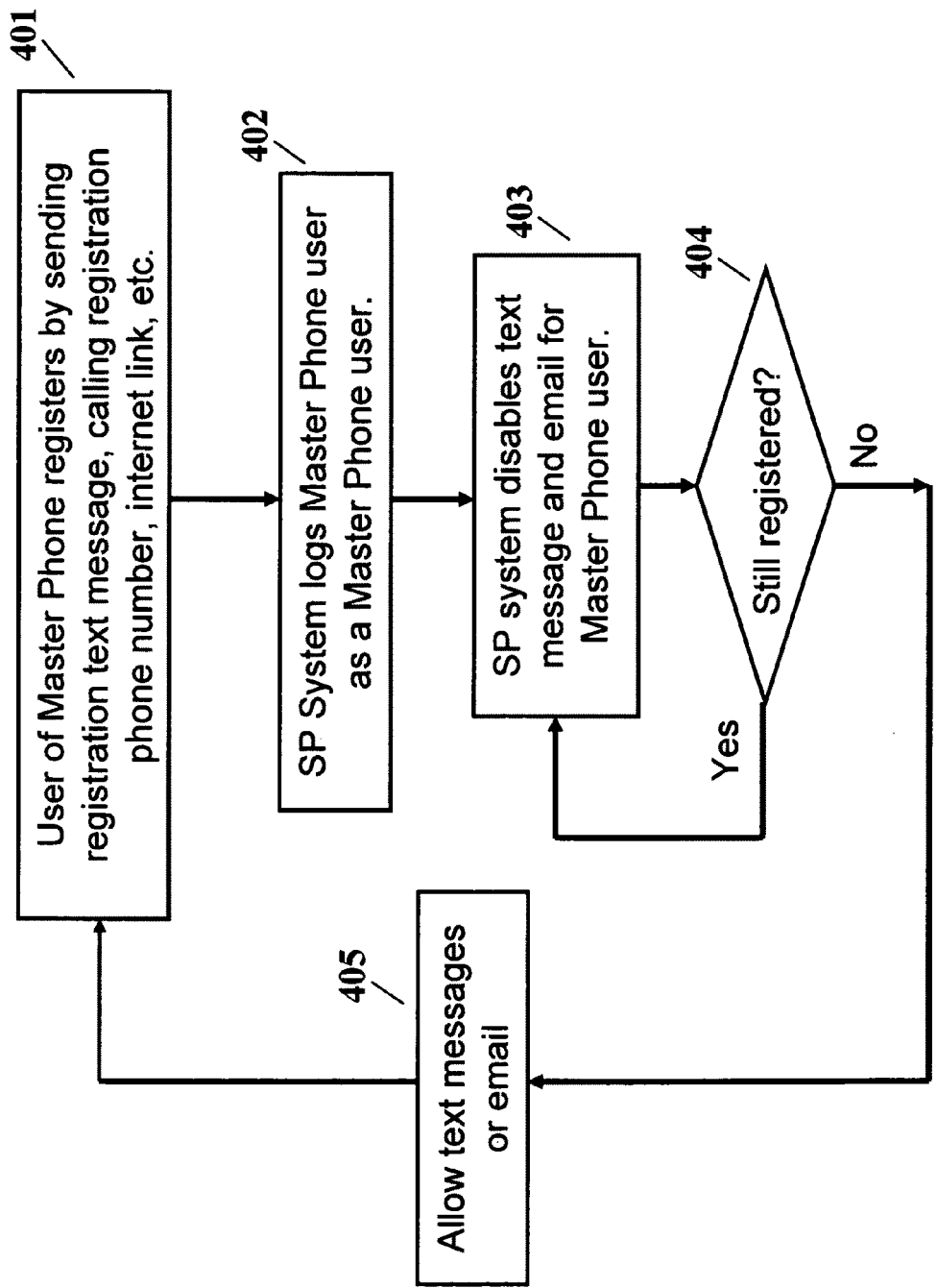
FIG. 4 shows the process of registration of a master phone.

A registration sequence for a master phone according to the present invention is shown in FIG. 4. Here, in step 401 the user of a master phone registers by a communication with the SP. This communication may take a number of forms such as for example a text message, calling a registration phone number, or an Internet link. It is important that the act of registration does not distract the driver any more than necessary. Therefore it would be useful for a driver who frequently registers to assign the registration phone number to a speed dial number, or to create a standard text message that can be sent with the press of a single key, preferably to a special destination set up by the SP and reserved for this purpose that is enabled for texting even when a phone is traveling faster than the disable threshold. Also, the SP may create a short number sequence that when dialed automatically registers a phone as a master phone. In step 402 the SP system logs the master phone user as the current active user of a master phone. Then, in step 403 and 404, the SP system will disable texting for the master phone user as long as he is still registered. When he is no longer registered according to step 404, he may be allowed to resume text messaging per step 405 as long as a re-enable time period has passed.

Alternately, it is possible to install a cell phone or equivalent functionality in a mass transit vehicle to act as a form of permanent master phone. This is one solution to the problem that occurs when the operator forgets to register as a master phone, thus leaving his passengers without the ability to text. However, this still leaves the problem that the operator's personal cell phone must be disabled while moving. Assuming that the service provider is made aware of the cell phones of all professional mass transit drivers, these phones can be disabled when moving. Unfortunately, that prevents a professional driver from texting when traveling on mass transit as a passenger. Thus, the best overall solution may be for the actual operator of a mass transit vehicle to be required to register his phone as a master phone, thereby allowing a different professional driver to text on a mass transit vehicle when off duty and riding as a passenger.

De-registration of a master phone may occur in a number of ways. The driver may be offered the following choices for example:
1) auto-deregistration (x minutes of slow or stopped motion, equal to or longer than the re-enable period).
2) manual deregistration—stay registered until operator deregisters.
3) registration for a fixed time (one shift for a professional driver).

Note that having multiple active master phones on a vehicle could enable the driver to de-register and text. People who drive in carpools as registered master phone user and then park and get on public transport can compound this problem if their phones don't de-register automatically. Thus, it may be preferred to have automatic de-registration after the re-enable period has transpired. Still, the following sequence of events demonstrates one scenario that could arise even with automatic de-registration after a re-enable period:

1. The cell phone of a non-professional driver is currently registered as a master phone;
2. For a period of time less than the re-enable period, the speed of his phone has been less than the disable threshold; and
3. His phone is then determined to be within the envelope of a master phone registered to a professional driver of a mass transit vehicle.

Upon detecting this situation, the cell phone of the nonprofessional driver can be automatically de-registered to avoid the situation where two master phones are present on the mass transit vehicle. Regardless, it may be beneficial for the SP system to determine if multiple master phones are active on the same mass transit vehicle and take steps to remedy the situation. A general way to handle this scenario is that if registered master phones of a non-professional driver and a professional driver are within the same envelope, the phone of the non-professional driver is automatically de-registered and allowed to text at speed.

Figure 5:
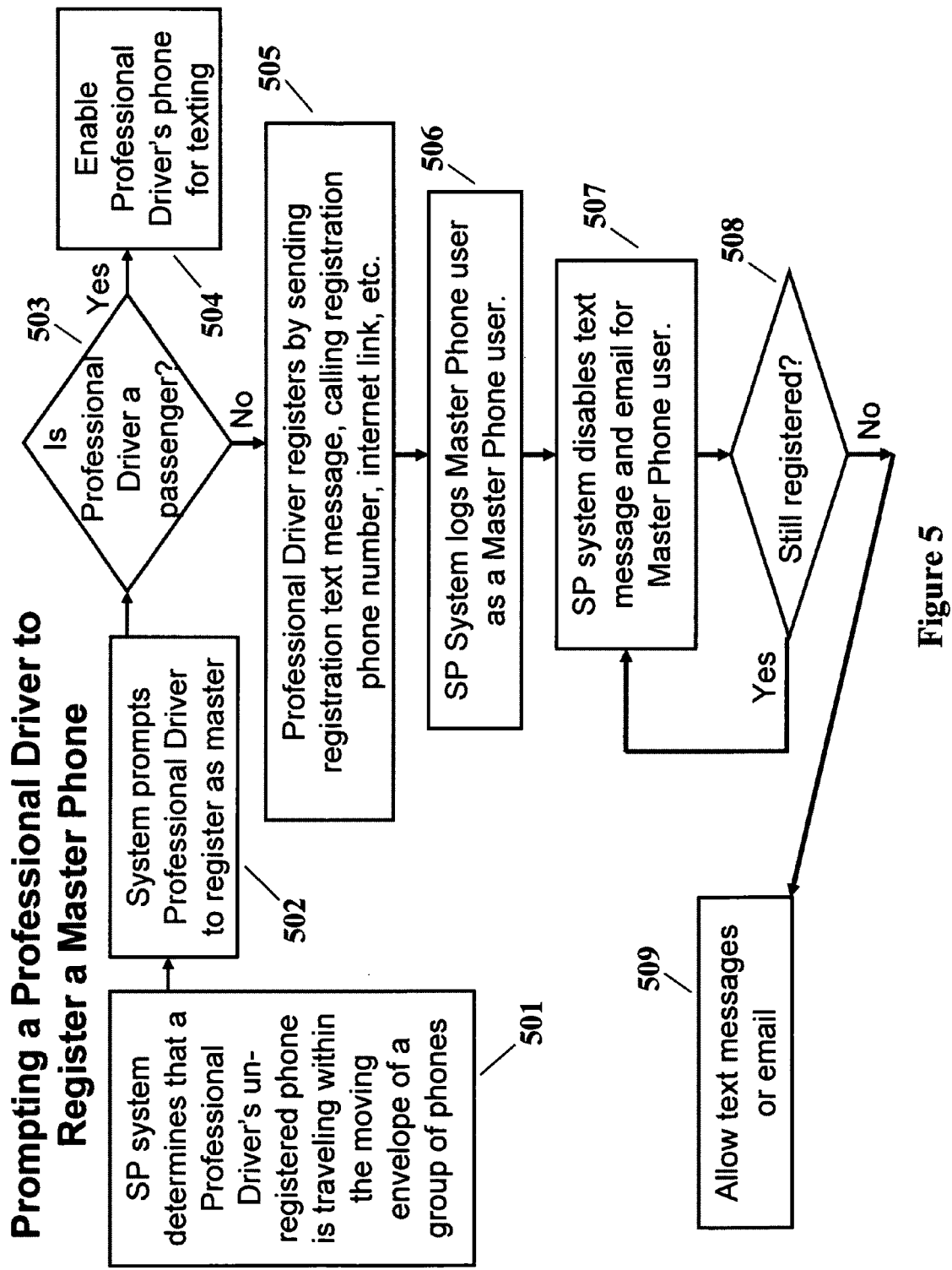
FIG. 5 shows the process whereby the SP system determines that an un-registered professional operator is traveling within the moving envelope of a group of phones, and the professional operator is prompted to register as a master phone user.

For several embodiments of the present invention, a mass transit driver must register his phone in order for his passenger's phones to text. If he forgets to register, his passengers will be annoyed when attempting to text. In order to avoid unhappy passengers, a driver can also be known to the SP system as a professional driver, and then when his phone is in the presence of a group of people with the same position and speed as the professional driver, the professional driver can be prompted to register. Essentially, a group of cell phone users riding as passengers may form their own envelope and a professional driver whose phone is also in that envelope may be prompted to register in order to enable the passengers to text. This registration could also be done automatically, but that could disable the driver in some scenarios when he is on a bus as a passenger. An example process for prompting a professional driver to register his phone as a master phone is shown in FIG. 5. In step 501, the SP system determines that a professional driver whose cell phone is currently not registered as a master phone is traveling within the envelope of a group of cell phones. In step 502 the system then prompts the professional driver to register his phone as a master phone. In the interest of safety, this prompt should occur in a manner with minimal distraction of the professional driver in case he should currently be operating the vehicle. In step 503 a determination is made by the professional driver as to whether he is the operator of the vehicle or a passenger. If he is a passenger, his phone will be enabled for texting according to step 504. If however, he is the operator of the vehicle, he would register his cell phone according to step 505 as a master phone, and would be logged at the SP system as a master phone user and the active operator of the vehicle. Subsequently, in step 507 the SP system will disable texting for the professional driver. In step 508 upon deregistration of the professional driver's phone to be no longer a master phone, he would be allowed to text according to step 509 after a re-enable period of time has passed.

Figure 6:
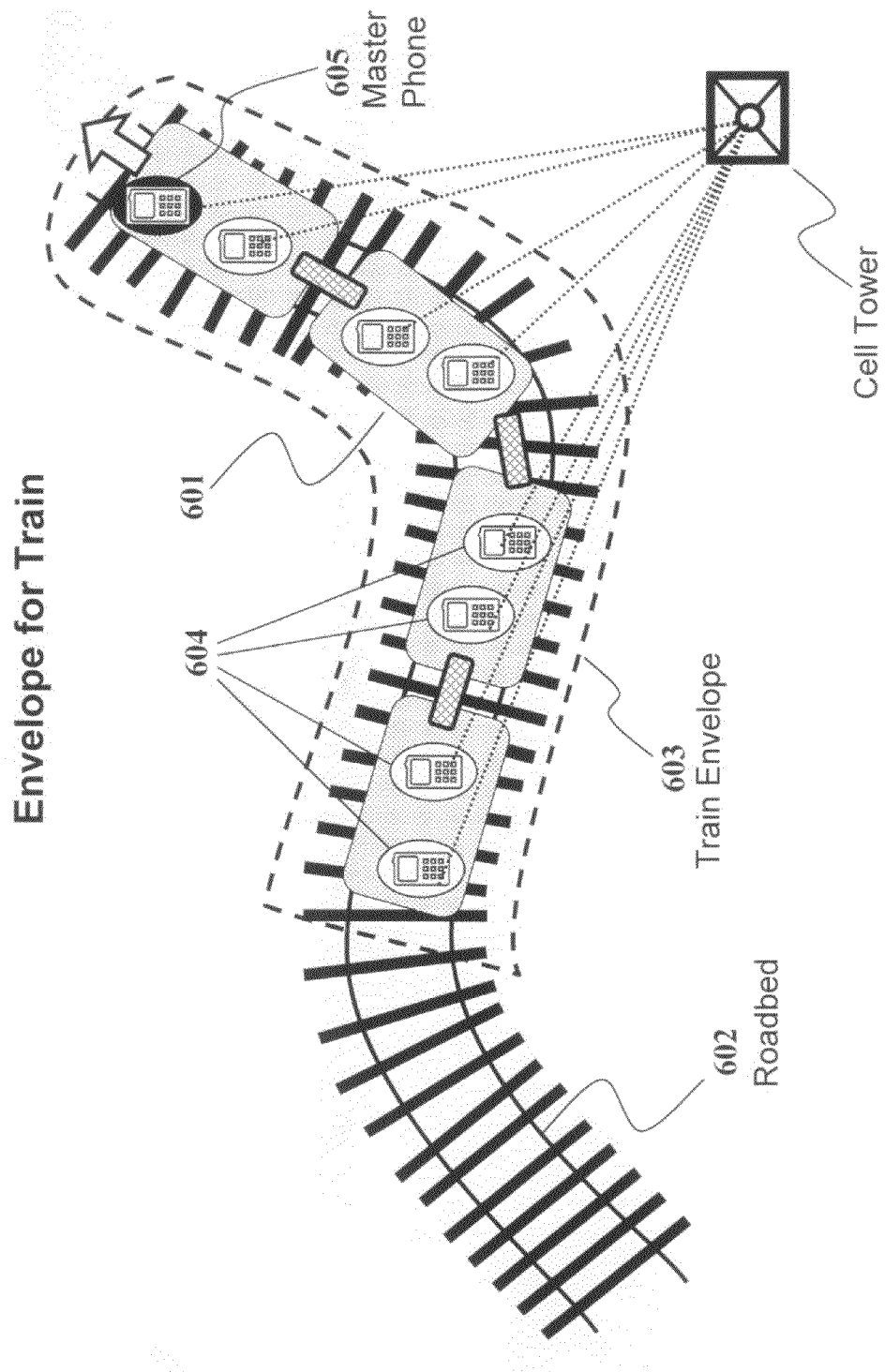
FIG. 6 shows a train on a railroad bed where passengers are allowed to text on their cell phones and the operator of the train is not.

Trains have unique problems as described for FIG. 6. They also have restrictions that simplify these problems. A long train 601 can travel on a railroad bed 602 that curves substantially, so the envelope 603 for a train of any substantial length is unusually shaped and difficult to associate with a passenger's cell phone 604 based simply on following a master phone 605. At the same time, the roadbed is known and each increment of a railroad bed has a very specific GPS location. For (long) trains, it may be better to determine the locations of passengers' cell phones based on roadbed coordinates and deal with the operator of the train by another means—for instance automatic registration of an operator's phone when on a roadbed that causes automatic disablement of texting for his phone. Alternately, a professional operator's phone can remind him when on a roadbed that he should register it as a master phone, and if he is a passenger and not the active operator, he can signal via his phone that he is a passenger and to not remind him further for the duration of the trip. For a professional operator to successfully indicate that he is a passenger, there must be another phone on the same train belonging to the active operator and currently registered as a master phone. For trains, the delay that a train must be below the minimum disabling speed before texting is re-enabled may be different than for cars, trucks, and busses, and is most probably set according to the maximum time that a train is typically stopped at a station. A very short train (cable car, or a light rail) may be treated like a bus or alternately like a train.

A goal of the present invention is to be as effective as possible in preventing drivers and operators of motor vehicles from texting while in motion. At the same time, another goal of the present invention is to accomplish this with an implementation strategy that can be executed quickly and using existing equipment wherever possible. While the system as described herein may accomplish this goal with a high degree of success, there may still be individuals who attempt to circumvent the system. For instance, a solitary driver may find a way to carry two phones such that one can be registered as a master phone while the other is used for texting. Such an attempt at circumvention can be detected by the SP system for example by:

1) Determining that a driver frequently has a second phone active in his car and it always comprises the same phone. Working in conjunction with government authorities, the user assigned to each phone may be contacted and validated;
2) Determining that a driver frequently has a second phone in his car yet rarely uses the carpool lane. Working in conjunction with government authorities, the user assigned to each phone may be contacted and validated; or
3) Determining that a registered driver frequently has a passenger's phone directly to his left or in front of him, but within the same envelope.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps preformed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

What is claimed is:

1. A method for providing a cellular phone service wherein a service provider selectively disables text messaging for individual cell phones within a vehicle, comprising:

receiving a request to register a first cell phone as a master phone, the request being voluntarily initiated by a user of the first cell phone;

temporarily registering the first cell phone as the master phone in response to the request to register;

wherein the master phone is presumed to belong to a driver of the vehicle;

determining, upon registering the first cell phone as the master phone, that a second cell phone is within the vehicle when the second cell phone is within an envelope of the master phone; and detecting that the first cell phone has a velocity that is greater than a disable threshold and disabling text messaging for the first cell phone; and permitting text messaging for the second cell phone at any velocity when the first cell phone is registered as the master phone, wherein permitting text messaging occurs without requiring an action by the second cell phone;

detecting that the second cell phone has a velocity that is greater than the disable threshold;

disabling text messaging for the second cell phone if the first cell phone is not registered as the master phone; and automatically re-enabling text messaging for the second cell phone if the first cell phone is registered as the master phone subsequent to detecting that the second cell phone has a velocity that is greater than the disable threshold.

2. The method of claim 1, further comprising:

automatically re-enabling text messaging for the first cell phone when the velocity of the first cell phone drops below the disable threshold for a predetermined length of time.

3. A method whereby a service provider disables text messaging for a driver of a vehicle in motion, comprising the steps of:

receiving a request to register an initial cell phone as a master phone, the request being voluntarily initiated by a user of the initial cell phone;

temporarily registering the initial cell phone as the master phone in response to the request to register;

wherein the master phone is presumed to belong to the driver;

establishing an envelope relative to the master phone that encompasses passengers that may be riding within the vehicle;

disabling text messaging for the initial cell phone when a velocity of the initial cell phone exceeds a disable threshold whether the initial cell phone is registered as the master phone or is not registered as the master phone;

allowing text messaging for additional cell phones within the envelope when a velocity of the additional cell phones exceeds the disable threshold and the initial cell phone is registered as the master phone; and disabling text messaging for the additional cell phones when the velocity of the additional cell phones exceeds the disable threshold and the initial cell phone is not registered as the master phone;

detecting that the additional cell phones have a velocity that is greater than the disable threshold;

disabling text messaging for the additional cell phones if the initial cell phone is not registered as the master phone; and automatically re-enabling text messaging for the additional cell phones if the initial cell phone is registered as the master phone subsequent to detecting that the additional cell phones have a velocity that is greater than the disable threshold.

4. The method of claim 3 wherein to enable text messaging for a cell phone when it is traveling in excess of the disable threshold, its direction of travel must also match the direction of travel of a master phone.

5. A method for implementation by a cellular service provider for preventing unauthorized texting on cellular communication devices while operating a moving vehicle comprising:

determining the position and speed of a first cell phone;

comparing the speed of the first cell phone with a disable threshold whereby the first cell phone is determined to be in a moving vehicle if the speed is greater than the disable threshold;

disabling texting for the first cell phone when determined to be in a moving vehicle, if the first cell phone is currently registered with the service provider as a master phone;

determining if the position of the first cell phone is within a position envelope of one or more additional master phones if the first cell phone is not currently registered as the master phone;

wherein the position envelope is defined by a predetermined range of distance relative to a location of the one or more master phones;

for each additional master phone for which the first cell phone is within the respective position envelope, comparing the speed of the additional master phone with the speed of the first cell phone to determine if the speeds track within a predetermined deviation threshold value;

allowing texting for the first cell phone if the speed of the first cell phone tracks that of the additional master phone within the predetermined deviation threshold value, wherein if texting for the first cell phone is disabled, automatically re-enabling text messaging for the first cell phones; and disabling texting for the first cell phone if no master phone whose position envelope contains the first cell phone is determined to have a speed that tracks within the predetermined deviation threshold value when compared with the speed of said first cell phone.

6. The method of claim 5, further including the step of:

if text messaging has been disabled for the first cell phone, re-enabling text messaging for the first cell phone after the speed of said first cell phone drops below the disable threshold for a pre-determined period of time.

7. The method of claim 5 wherein in order to enable text messaging for the first cell phone when it is traveling in excess of the disable threshold, the direction of travel of the first cell phone must also match the direction of travel of a master phone.

8. A method whereby a cellular service provider disables text messaging for a cell phone of an active operator of a train, wherein the active operator is one of a plurality of known operators of trains having information associated with cell phones of the plurality of known operators of trains stored in a database accessible to the cellular service provider, the method comprising the steps of:

establishing a position envelope for the train based at least in part on a roadbed on which the train is traveling;

identifying one or more cell phones of possible operators within the position envelope based on the information associated with the cell phones of the plurality of known operators of trains stored in the database;

disabling text messaging for the one or more cell phones of possible operators within the position envelope;

receiving a request to register the cell phone of the active operator as a master phone, the request being voluntarily initiated by the active operator; and enabling, upon registration of the cell phone of the active operator as the master phone, text messaging for the one or more cell phones of possible operators within the position envelope not registered as the master phone.

9. The method of claim 8 further comprising:
prompting the one or more possible operators within the position envelope to register with the cellular service provider as the active operator of the train if they are the active operator of the train.

10. A method whereby a cellular service provider disables text messaging for a cell phone of an active driver of a mass transit vehicle while in motion wherein the active driver is one of a plurality of known drivers of mass transit vehicles having information associated with cell phones of the plurality of known drivers of mass transit vehicles stored in a database accessible to the cellular service provider, the method, comprising the steps of:
determining an envelope of a group of cell phones traveling at substantially the same velocity as each other, wherein the velocity is above a disable threshold;
identifying one or more cell phones of possible drivers within the envelope based on the information associated with the cell phones of the plurality of known drivers of mass transit vehicles stored in the database;
disabling text messaging for the one or more cell phones of possible drivers within the envelope;
receiving a request to register the cell phone of the active driver of the mass transit vehicle as a master phone, the request being voluntarily initiated by the active driver; and
enabling, upon registration of the cell phone of the active driver as the master phone, text messaging for the one or more cell phones of possible drivers within the envelope not registered as the master phone.

11. The method of claim 10 wherein a vehicle type driven by each of the known drivers of mass transit vehicles is stored in the database, the method further comprising:
modifying a size of the envelope based on the vehicle type associated with each of the one or more possible drivers; and
identifying one or more cell phones of additional possible drivers within the modified envelope based on cell phone information of known mass transit vehicle drivers stored in a database accessible to the cellular service provider.

12. The method of claim 10 further comprising:
prompting the one or more possible drivers within the envelope to register with the cellular service provider as the active driver of the mass transit vehicle if they are the active driver of the mass transit vehicle.

13. The method of claim 5, further comprising:
receiving a request to register the first cell phone as the master phone, the request being voluntarily initiated by a user of the first cell phone; and
temporarily registering the first cell phone as the master phone in response to the request to register.

14. The method of claim 13, wherein the request to register the first cell phone as the master phone is initiated by way of one or more of text messaging a pre-determined number, calling a pre-determined number, and accessing a website location.

15. The method of claim 1, wherein the request to register the first cell phone as the master phone is initiated by way of one or more of text messaging a pre-determined number, calling a pre-determined number, and accessing a website location.

16. The method of claim 3, wherein the request to register the initial cell phone as the master phone is initiated by way of one or more of text messaging a pre-determined number, calling a pre-determined number, and accessing a website location.

17. The method of claim 8, wherein the request to register the cell phone of the active operator as the master phone is initiated by way of one or more of text messaging a pre-determined number, calling a pre-determined number, and accessing a website location.

18. The method of claim 10, wherein the request to register the cell phone of the active driver as the master phone is initiated by way of one or more of text messaging a pre-determined number, calling a pre-determined number, and accessing a website location.

19. The method of claim 1, further comprising automatically re-enabling, if disabled, text messaging for the second cell phone when the velocity of the second cell phone drops below the disable threshold for a predetermined length of time.

* * * * *